(12) United States Patent
Winger

(10) Patent No.: US 8,305,497 B2
(45) Date of Patent: Nov. 6, 2012

(54) JOINT MOSQUITO AND ALIASING NOISE REDUCTION IN VIDEO SIGNALS

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1254 days.

(21) Appl. No.: 12/060,323

(22) Filed: Apr. 1, 2008

(65) Prior Publication Data

US 2009/0027548 A1 Jan. 29, 2009

Related U.S. Application Data

(60) Provisional application No. 60/962,207, filed on Jul. 27, 2007.

(51) Int. Cl.
*H04N 5/00* (2011.01)
*H04B 1/66* (2006.01)

(52) U.S. Cl. ........................ 348/607; 348/620; 375/240.2

(58) Field of Classification Search .................. 348/607, 348/620; 382/260; 375/240.2
See application file for complete search history.

(56) References Cited

U.S. PATENT DOCUMENTS

| | | | | |
|---|---|---|---|---|
| 5,479,215 A * | 12/1995 | Chmielewski et al. | ....... | 348/627 |
| 5,802,218 A * | 9/1998 | Brailean | ....... | 382/275 |
| 6,064,776 A * | 5/2000 | Kikuchi et al. | ....... | 382/260 |
| 6,144,412 A * | 11/2000 | Hirano et al. | ....... | 348/441 |
| 6,374,279 B1 * | 4/2002 | Young | ....... | 708/319 |
| 6,847,737 B1 * | 1/2005 | Kouri et al. | ....... | 382/260 |
| 7,136,538 B2 * | 11/2006 | Kitagawa | ....... | 382/275 |
| 8,027,383 B2 * | 9/2011 | Leung et al. | ....... | 375/240.03 |
| 2004/0036807 A1 * | 2/2004 | Takahashi et al. | ....... | 348/700 |
| 2004/0189874 A1 * | 9/2004 | Wang et al. | ....... | 348/627 |
| 2005/0196072 A1 * | 9/2005 | Zhong | ....... | 382/298 |
| 2006/0171473 A1 * | 8/2006 | Schoner | ....... | 375/240.27 |
| 2006/0182183 A1 * | 8/2006 | Winger | ....... | 375/240.27 |
| 2007/0036534 A1 * | 2/2007 | Sasaki | ....... | 396/85 |
| 2007/0081596 A1 * | 4/2007 | Lin et al. | ....... | 375/240.27 |
| 2007/0188660 A1 * | 8/2007 | Kai et al. | ....... | 348/571 |
| 2007/0286290 A1 * | 12/2007 | Leung et al. | ....... | 375/240.27 |
| 2008/0297652 A1 * | 12/2008 | Buttle et al. | ....... | 348/441 |
| 2009/0195697 A1 * | 8/2009 | Kanumuri et al. | ....... | 348/607 |

* cited by examiner

*Primary Examiner* — James R Sheleheda

(74) *Attorney, Agent, or Firm* — Mendelsohn, Drucker & Associates, P.C.; Steve Mendelsohn

(57) ABSTRACT

In one embodiment of the invention, decompressed video signals are upscaled and then filtered using a combined mosquito noise reduction (MNR) and aliasing coring filter that reduces both mosquito noise in the decompressed video signals as well as aliasing noise resulting from the upscaling process. In one implementation, the combined coring filter includes a dual-band filter having two passbands interleaved with two stopbands. The strength of the coring filter may be dynamically controlled based on compression information (e.g., quantizer scales indicative of video quality) associated with the compressed video bitstream from which the decompressed video is recovered.

15 Claims, 4 Drawing Sheets

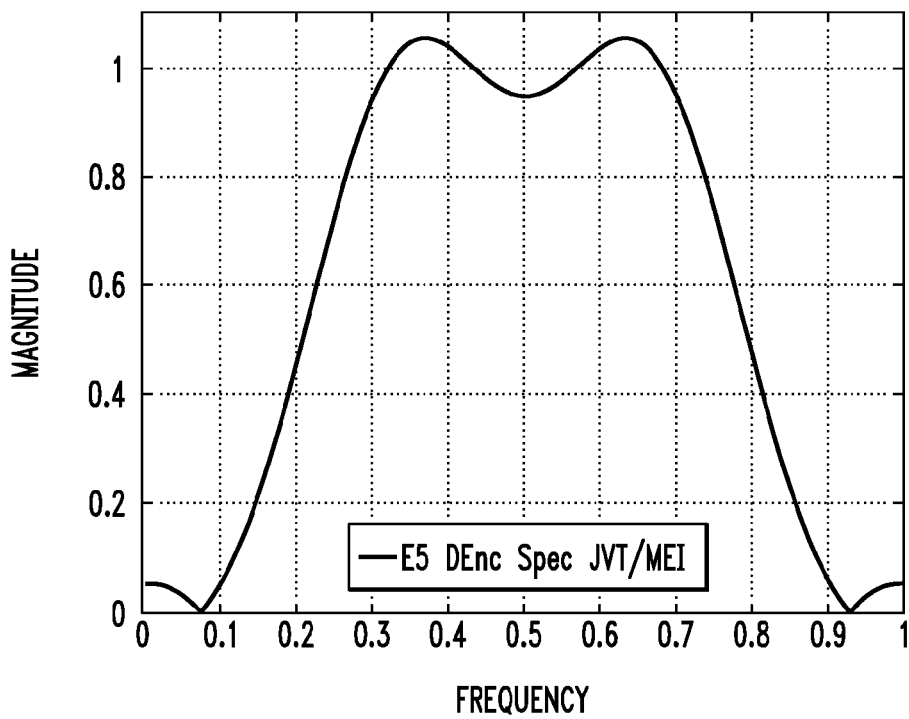
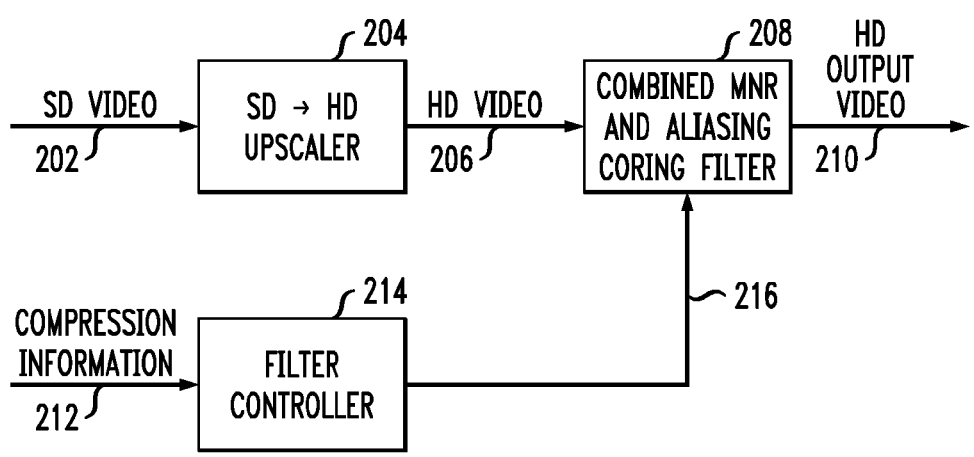

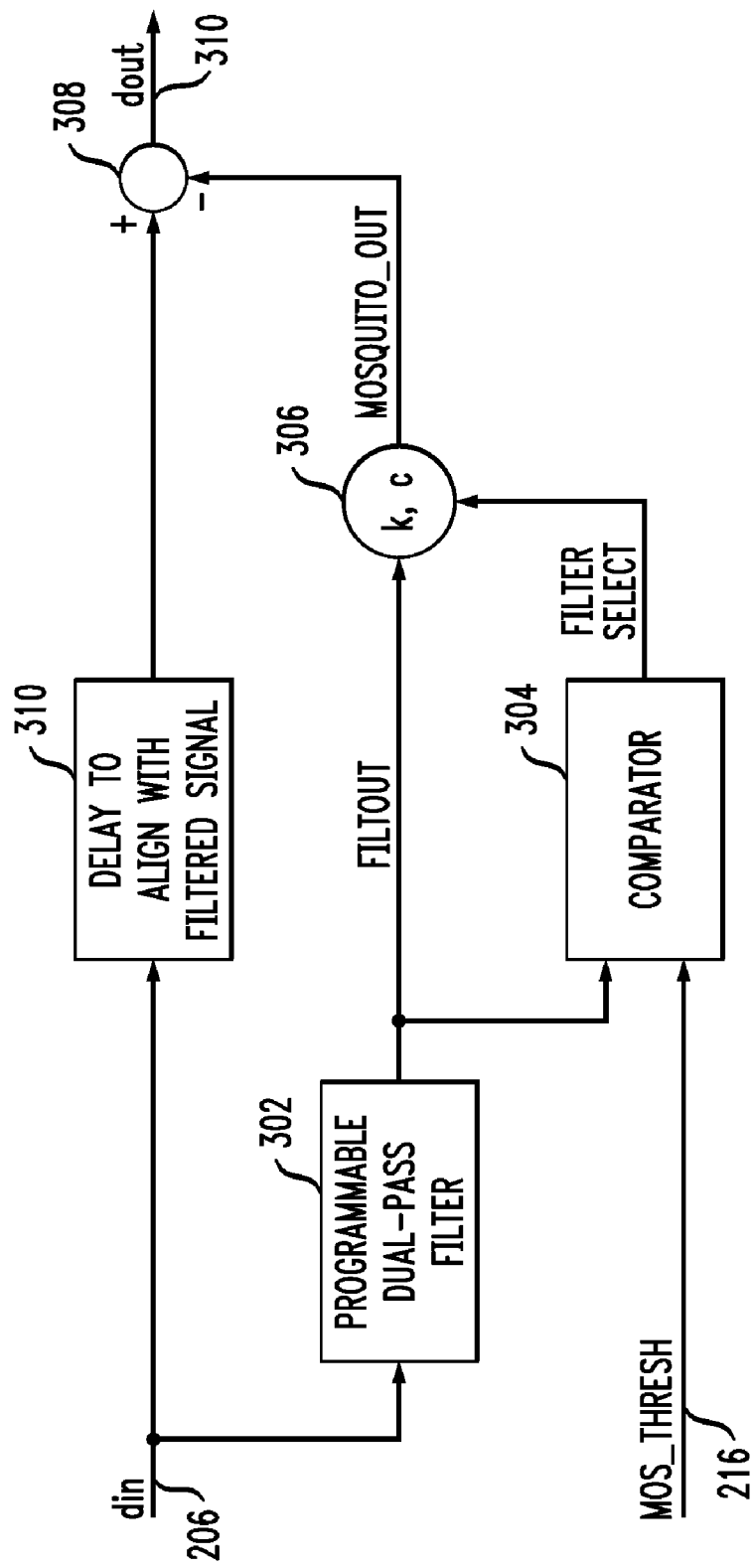

JOINT MOSQUITO AND ALIASING NOISE REDUCTION IN VIDEO SIGNALS

CROSS-REFERENCE TO RELATED APPLICATIONS

This application claims the benefit of the filing date of U.S. provisional application No. 60/962,207, filed on Jul. 27, 2007, the teachings of which are incorporated herein by reference.

BACKGROUND OF THE INVENTION

1. Field of the Invention

The present invention relates to video signal processing, and, in particular, to filtering decompressed digital video signals to reduce noise, such as mosquito noise.

2. Description of the Related Art

Mosquito noise is a term used to describe temporal Gibb's phenomena in decompressed digital video. Such phenomena are typically medium-frequency spatial artifacts with a high temporal frequency resulting from truncation and/or quantization of transform coefficients in the compressed digital video representation. Mosquito noise is so termed because it looks like beating mosquito wings, i.e., semi-transparent high-frequency noise, which is usually most apparent on flat areas adjacent to strong edges in the video. One way to reduce mosquito noise is to apply a coring filter using a spatial (e.g., one-dimensional, horizontal) bandpass filter having low-frequency and high-frequency stopbands separated by a single, mid-frequency passband. In such a coring filter, the bandpass filter is applied to one copy of the input signal, and the bandpass filter output is then subtracted from another copy of the input signal to generate a coring filter output having attenuated frequency components corresponding to the passband of the bandpass filter. As used in this specification, "stopband" and "passband" are relative terms, whereby a stopband is a frequency range in which the filter attenuates received signals more than the attenuation applied by the filter to a different frequency range corresponding to a passband.

FIG. 1 shows the frequency response of an exemplary symmetrical 13-tap bandpass filter that can be used in a coring filter to reduce mosquito noise in decompressed digital video. The coefficients [coef 0, coef 1, coef 2, coef 3, coef 4, coef 5, coef 6] of the symmetrical 13-tap bandpass filter of FIG. 1 are [1207, 0, −592, 0, −146, 0, 80]/2048, where coef 0 is the coefficient for the center (i.e., $7^{th}$) tap, coef 1 is the coefficient for the $6^{th}$ and $8^{th}$ taps, coef 2 is the coefficient for the $5^{th}$ and $9^{th}$ taps, and so on until coef 6 is the coefficient for the $1^{st}$ and $13^{th}$ taps.

The bandpass filter of FIG. 1 provides a suitable level of noise reduction in some digital video applications. One application in which the bandpass filter of FIG. 1 might not provide an acceptable level of noise reduction is when the digital video signal is upscaled before mosquito noise reduction (MNR) is implemented using the bandpass filter of FIG. 1, such as when standard-definition (SD) video is upscaled to generate high-definition (HD) video. For example, when converting SD video having a width of 720 pixels into HD video having a width of 1280 or 1920 pixels, the SD video is upscaled by a factor of 1.78 or 2.67, respectively, to generate the HD video. In such applications, unacceptable levels of aliasing noise resulting from the upscaling process may be present in the output video signal produced using the bandpass filter of FIG. 1.

SUMMARY OF THE INVENTION

In one embodiment, the present invention is a method and apparatus for processing digital video signals. An input video signal having a first dimension is upscaled to generate an upscaled video signal having a first dimension larger than the first dimension of the input video signal. The upscaled video signal is filtered using a filter to generate a filtered video signal, wherein the filter comprises two passbands interleaved with two stopbands, such that the method reduces both (1) mosquito noise present in the input video signal and (2) aliasing noise resulting from the upscaling.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows the frequency response of an exemplary symmetrical 13-tap bandpass filter that can be used in a coring filter to reduce mosquito noise in decompressed digital video;

FIG. 2 shows a block diagram of a portion of a video processor according to one embodiment of present invention;

FIG. 3 shows a block diagram of the combined coring filter of FIG. 2, according to one embodiment of the present invention;

DETAILED DESCRIPTION

Figure 4:
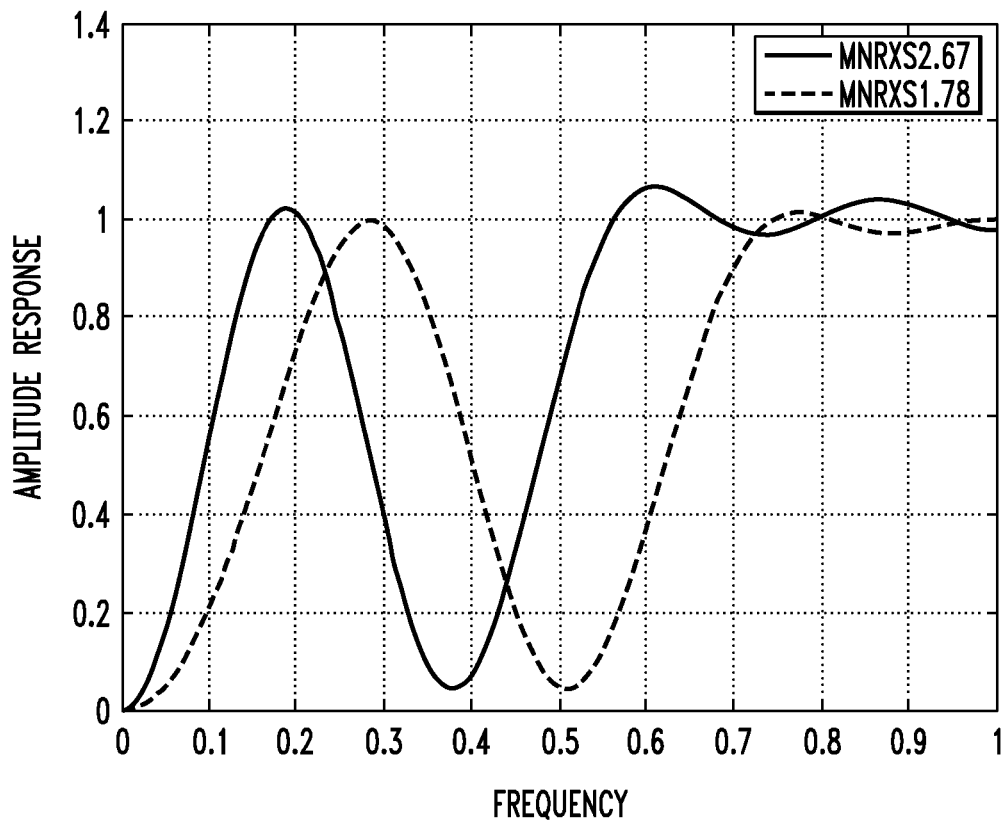
FIG. 4 graphically represents the frequency responses of two different possible implementations of the programmable dual-pass filter of FIG. 3.

FIG. 2 shows a block diagram of a portion of a video processor 200, according to one embodiment of present invention. Although not fully represented in FIG. 2, video processor 200 receives a compressed video bitstream (not shown in FIG. 2), such as those conforming to an MPEG or other suitable video compression standard, and decompresses the compressed video bitstream to generate a decompressed video stream for display.

FIG. 2 shows only one small portion of the overall processing implemented by video processor 200. In particular, FIG. 2 shows upscaler 204, which (1) receives a decompressed standard-definition (SD) video stream 202 recovered by video processor 200 from the compressed video bitstream and (2) performs an upscaling operation to convert the SD video stream into a high-definition (HD) video stream 206. Combined mosquito noise reduction (MNR) and aliasing coring filter 208 filters HD video stream 206 to generate HD output video stream 210, reducing both (i) mosquito noise resulting, for example, from quantization and/or truncation of transform coefficients during the video compression processing used to generate the compressed video bitstream, as well as (ii) aliasing noise resulting from the processing of upscaler 204.

The filtering implemented by combined coring filter 208 is preferably dynamically controlled by filter controller 214, which (i) receives certain compression information 212 recovered or otherwise derived from the compressed video bitstream by video processor 200 and (ii) generates control signals 216 that control the operations of combined coring filter 208. In some implementations of video processor 200, combined coring filter 208 is a static filter; in which case, filter controller 214 may be omitted. Depending on the particular implementation, combined coring filter 208 might be applied to only the luma signal and not the chroma signals in HD video stream 206.

FIG. 3 shows a block diagram of combined coring filter 208 of FIG. 2, according to one embodiment of the present invention. In this implementation, input signal din is unfiltered HD video stream 206 of FIG. 2, and output signal dout is HD output video stream 210 of FIG. 2, where output signal dout is generated by difference node 308 of FIG. 3 according to Equation (1) as follows:

$$d\text{out} = d\text{in} - \text{mosquito\_out}, \quad (1)$$

where mosquito_out is generated by processing node 306 according to Equation (2) as follows:

$$\text{mosquito\_out} = k*\text{filtout} + c, \quad (2)$$

where:
  filtout is the filtered signal generated by programmable dual-pass filter 302; and
  k and c are parameters selected by comparator 304 according to the following conditions:

| if | (\|filtout\| > a*MOS_THRESH), | then k = 0, c = 0 |
|---|---|---|
| elseif | (\|filtout\| > MOS_THRESH), | then k = −b, c = sign(filtout)* (b+1)*MOS_THRESH |
| else | (\|filtout\| ≦ MOS_THRESH) | and k = 1, c = 0 | where:
  sign(x)=1 when x≧0; sign(x)=−1 when x<0;
  MOS_THRESH is a mosquito threshold value 216 specified by filter controller 214 of FIG. 2; and
  a and b are parameters, whose values are selected depending on whether or not combined coring filter 208 is to reduce mosquito noise in addition to aliasing noise. If MR=1, then values for a and b are selected to program combined coring filter 208 to reduce mosquito noise in addition to aliasing noise. If MR=0, then values for a and b are selected to program combined coring filter 208 to reduce only aliasing noise. In one implementation:
  if MR=0, then a=2.0 and b=1.0; and
  if MR=1, then a=1.5 and b=2.0.

Delay 310 is implemented to temporally align the input video signal din with the signal mosquito_out at difference node 308 to account for the processing times of elements 302, 304, and 306.

FIG. 4 graphically represents the frequency responses of two different possible implementations of dual-pass filter 302 of FIG. 3: one (labeled "MNRXS1.78") for conversion of 720-pixel SD video into 1280-pixel HD video and the other (labeled "MNRXS2.67") for conversion of 720-pixel SD video into 1920-pixel HD video. Each of these filter implementations has two passbands interleaved with two stopbands. For example, as represented in FIG. 4, the MNRXS2.67 filter has a low-frequency stopband below about 0.1, a mid-frequency passband between about 0.1 and 0.3, a mid-frequency stopband between about 0.3 and 0.5, and a high-frequency passband above about 0.5. Similarly, the MNRXS1.78 filter has a low-frequency stopband below about 0.2, a mid-frequency passband between about 0.2 and 0.4, a mid-frequency stopband between about 0.4 and 0.6, and a high-frequency passband above about 0.6. Such dual-pass filters are designed to be used in coring filters, such as combined coring filter 208 of FIG. 2, to reduce both (1) mosquito noise present in both decompressed SD video stream 202 and HD video stream 206 of FIG. 2 and (2) aliasing noise in HD video stream 206 resulting from the upscaling performed by upscaler 204.

Dual-pass filter 302 of FIG. 3 may be implemented using a symmetrical 13-tap programmable filter according to Equation (3) as follows:

$$Y[n] = \text{coeff}6*X[n+6] + \text{coeff}5*X[n+5] + \quad (3)$$
$$\text{coeff}4*X[n+4] + \text{coeff}3*X[n+3] +$$
$$\text{coeff}2*X[n+2] + \text{coeff}1*X[n+1] + \text{coeff}0*X[n] +$$
$$\text{coeff}1*X[n-1] + \text{coeff}2*X[n-2] + \text{coeff}3*X[n-3] +$$
$$\text{coeff}4*X[n-4] + \text{coeff}5*X[n-5] + \text{coeff}6*X[n-6]$$

where:
  X[n] is the unfiltered video signal din applied to dual-pass filter 302;
  Y[n] is the filtered video signal filtout generated by dual-pass filter 302; and
  coeff 0-coeff 6 are the coefficients of dual-pass filter 302. For the two dual-pass filter implementations of FIG. 4, the coefficients [coeff 0, coeff 1, coeff 2, coeff 3, coeff 4, coeff 5, coeff 6] may be specified as follows:
  MNRXS1.78: [1494, −324, 77, 126, −144, −302, −180]/ 2048
  MNRXS2.67: [1282, −276, 136, −210, −361, −27, 97]/ 2048

Figure 5:
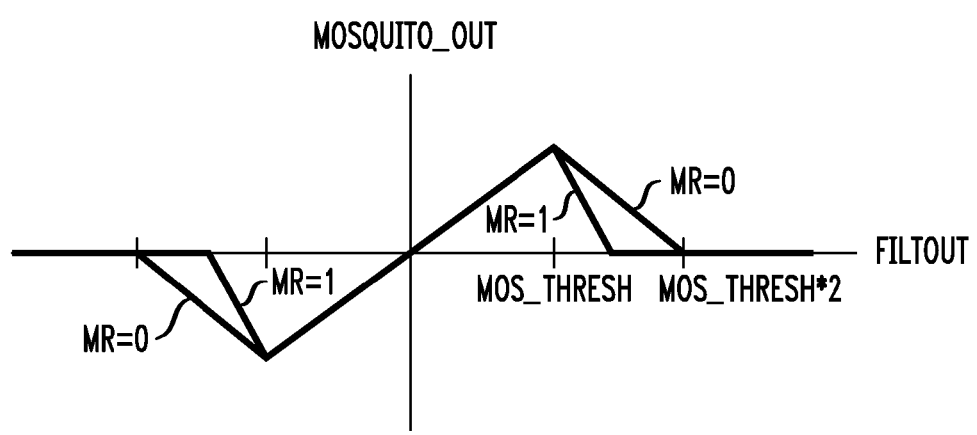
FIG. 5 graphically represents the transfer function of mosquito_out of Equation (4) as a function of the filtered signal filtout in units of MOS_THRESH for both MR=0 and MR=1.

FIG. 5 graphically represents the transfer function of mosquito_out of Equation (2) as a function of the filtered signal filtout (i.e., Y[n] of Equation (3)) in units of MOS_THRESH for both MR=0 and MR=1. As indicated by the shape of the transfer function in FIG. 5, when the filtered output signal filtout has a relatively large magnitude or a relatively small magnitude, then the strength of the filtering applied to the input signal din is less than when the filtered output signal filtout has an intermediate magnitude, where the filter strength peaks at |filtout|=MOS_THRESH.

Referring again to FIG. 2, filter controller 214 dynamically generates the mosquito threshold MOS_THRESH 216 (used by comparator 304 of FIG. 3) based on certain compression information 212 corresponding to the compressed video bitstream used to generate decompressed SD video stream 202. In general, filter controller 214 is designed to select little or no mosquito noise reduction when the picture quality is high. As picture quality decreases to a minimum picture quality threshold, the strength of the MNR filtering increases (e.g., within three contiguous linear segments). Below the minimum picture quality threshold, MNR filtering is clipped at a maximum strength level (e.g., corresponding to the end of the third linear segment).

In one implementation of the present invention, filter controller 214 generates the mosquito threshold MOS_THRESH according to the following logic:

| If | (QUAL<QS0) | // no MNR |
|---|---|---|
|  | Then MOS_THRESH = MS0; | |
| Elseif | (QUAL<QS1) | // minimal MNR |
|  | Then MOS_THRESH = MS0 + (MS1−MS0)*(QUAL−QS0)/ (QS1−QS0); // 1$^{st}$ linear segment | |
| Elseif | (QUAL<QS2) | // transition |
|  | Then MOS_THRESH = MS1 + (MS2−MS1)*(QUAL−QS1)/ (QS2−QS1); // 2$^{nd}$ linear segment | |
| Elseif | (QUAL<QS3) | // significant amount of MNR |

```
    Then MOS_THRESH = MS2 + (MS3−MS2)*(QUAL−QS2)/
(QS3−QS2); // 3rd linear segment
Else         // NOTE: QUAL>=QS3)     // maximum MNR
    Then MOS_THRESH = MS3,
``` where:

QUAL is the average PicAvQuant[ ]over the most recent N frames (e.g., N=16 or 32, i.e., one MPEG-2 group of pictures (GOP));

PicAvQuant[n] is the average quantizer scale for frame n, where the quantizer scale for the previous non-skipped macroblock is used for any skipped macroblocks;

QS0 is the mean quantizer_scale threshold (e.g., 6) below which no mosquito filtering happens;

QS1 is the mean quantizer_scale threshold (e.g., 8) below which minimal mosquito filtering happens;

QS2 is the mean quantizer_scale threshold (e.g., 12) for intermediate mosquito filtering;

QS3 is the mean quantizer_scale threshold (e.g., 16) above which maximum acceptable mosquito filtering happens;

MS0 is the mosquito threshold (e.g., 0) that turns off mosquito filtering;

MS1 is the mosquito threshold (e.g., 12) for weak mosquito filtering;

MS2 is the mosquito threshold (e.g., 16) for medium-strength mosquito filtering; and MS3 is the mosquito threshold (e.g., 20) for strong mosquito filtering.

Figure 6:
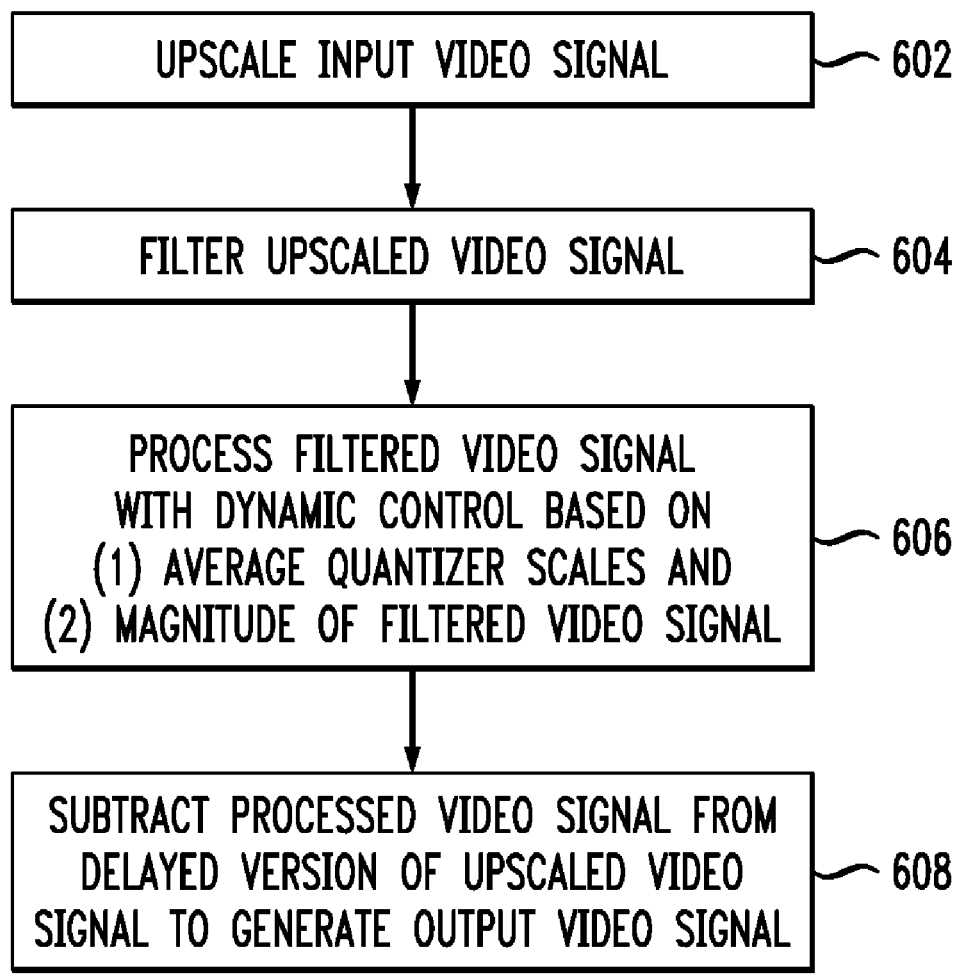
FIG. 6 shows a flow diagram corresponding to the processing of FIGS. 2 and 3.

FIG. 6 shows a flow diagram of the processing implemented in FIGS. 2 and 3. In particular:

Step 602 of FIG. 6 corresponds to the processing of upscaler 204 of FIG. 2;

Step 604 of FIG. 6 corresponds to the processing of filter 302 of FIG. 3;

Step 606 of FIG. 6 corresponds to the processing of controller 214 of FIG. 2 and comparator 304 and processing node 306 of FIG. 3; and Step 608 of FIG. 6 corresponds to the processing of delay 310 and difference node 308 of FIG. 3.

According to this implementation, the logic of filter controller 214 is designed to generate the mosquito threshold MOS_THRESH as a continuous, piecewise-linear function of the video quality parameter QUAL. Furthermore, in this implementation, filter controller 214 generates the mosquito threshold as a function of only the quantizer scales used to generate the corresponding compressed video bitstream. In other implementations, other compression information, such as video format/size, bitrate, and/or picture type (i.e., I, P, or B), may also be used in addition to or instead of the quantizer scales.

Although the present invention has been described in the context of implementing the one-dimensional, horizontal, spatial, dual-pass filter using a symmetrical 13-tap filter, the present invention can also be implemented using asymmetrical filters and/or filters having other than 13 taps.

Although the present invention has been described in the context of a coring filter that subtracts the filtered output of a dual-pass filter from the original input signal, the present invention can also be implemented by directly filtering the input signal, e.g., using an inverted version of the dual-pass filter.

Although the present invention has been described in the context of one-dimensional horizontal spatial filtering, in theory, the present invention could also be implemented in the context of one-dimensional vertical spatial filtering or two-dimensional spatial filtering. In theory, the present invention could also be implemented in the context of filtering that combines one- or two-dimensional spatial filtering with temporal filtering.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

I claim:

1. A processor-implemented method for processing digital video signals, the method comprising:
   (a) upscaling an input video signal having a first dimension to generate an upscaled video signal having a first dimension larger than the first dimension of the input video signal;
   (b) filtering the upscaled video signal using a filter to generate a filtered video signal, wherein the filter comprises two passbands interleaved with two stopbands; and
   (c) processing the filtered video signal to generate an output video signal, wherein the processing is dynamically controlled based on compression information associated with a compressed video bitstream from which the input video stream is generated, wherein strength of the processing is dynamically controlled based on the magnitude of the filtered video stream, such that the method reduces both (1) mosquito noise present in the input video signal and (2) aliasing noise resulting from the upscaling, wherein the strength of the processing for low- and high-magnitude filtered video is less than the strength of the processing for intermediate-magnitude filtered video.

2. The method of claim 1, wherein the input video signal is a decompressed SD video signal, and the upscaled video signal is an HD video signal.

3. The method of claim 1, wherein each first dimension is a horizontal spatial dimension, and the filter is implemented as a single multi-tap horizontal spatial filter.

4. The method of claim 1, wherein the two passbands interleaved with the two stopbands comprise a low-frequency stopband, a mid-frequency passband, and a high-frequency passband separated from the mid-frequency passband by a mid-frequency stopband.

5. The method of claim 4, wherein a processed version of the filtered video signal is subtracted from the input video signal to generate an output video signal having reduced mosquito noise and aliasing noise.

6. The method of claim 1, wherein the processing is dynamically controlled based on a measure of quality of the input video stream derived from the compression information.

7. The method of claim 6, wherein the measure of quality is based on an average of quantizer scales used to generate the compressed video bitstream.

8. The method of claim 1, wherein:
   the input video signal is a decompressed SD video signal, and the upscaled video signal is an HD video signal;
   each first dimension is a horizontal spatial dimension, and the filter is implemented as a single multi-tap horizontal spatial filter;
   the two passbands interleaved with the two stopbands comprise a low-frequency stopband, a mid-frequency passband, and a high-frequency passband separated from the mid-frequency passband by a mid-frequency stopband;
   the filtering further comprises processing the filtered video signal to generate a processed version of the filtered video signal, wherein the processed version is subtracted from the input video signal to generate an output video signal having reduced mosquito noise and aliasing noise;
   the processing is dynamically controlled based on a measure of quality of the input video stream derived from the compression information; and
   the measure of quality is based on an average of quantizer scales used to generate the compressed video bitstream.

9. An apparatus for processing digital video signals, the apparatus comprising:
   an upscaler adapted to upscale an input video signal having a first dimension to generate an upscaled video signal having a first dimension larger than the first dimension of the input video signal;
   a filter adapted to filter the upscaled video signal to generate a filtered video signal, wherein the filter comprises two passbands interleaved with two stopbands;
   a processor adapted to process the filtered video signal to generate an output video signal; and
   a controller adapted to dynamically control the processor based on compression information associated with a compressed video bitstream from which the input video stream is generated, wherein the controller is adapted to dynamically control strength of the processing performed by the processor based on the magnitude of the filtered video signal, such that the apparatus reduces both (1) mosquito noise present in the input video signal and (2) aliasing noise resulting from the upscaling, wherein the strength of the processing for low- and high-magnitude filtered video is less than the strength of the processing for intermediate-magnitude filtered video.

10. The apparatus of claim 9, wherein the two passbands interleaved with the two stopbands comprise a low-frequency stopband, a mid-frequency passband, and a high-frequency passband separated from the mid-frequency passband by a mid-frequency stopband.

11. The apparatus of claim 10, further comprising one or more processing elements adapted to generate and subtract a processed version of the filtered video signal from the input video signal to generate an output video signal having reduced mosquito noise and aliasing noise.

12. The apparatus of claim 9, wherein the controller is adapted to dynamically control the processor based on a measure of quality of the input video stream derived from the compression information.

13. The apparatus of claim 12, wherein the controller is adapted to generate the measure of quality based on an average of quantizer scales used to generate the compressed video bitstream.

14. A non-transitory machine-readable medium, having encoded thereon program code, wherein, when the program code is executed by a machine, the machine implements a method for processing digital video signals, the method comprising:
   (a) upscaling an input video signal having a first dimension to generate an upscaled video signal having a first dimension larger than the first dimension of the input video signal;
   (b) filtering the upscaled video signal using a filter to generate a filtered video signal, wherein the filter comprises two passbands interleaved with two stopbands; and
   (c) processing the filtered video signal to generate an output video signal, wherein the processing is dynamically controlled based on compression information associated with a compressed video bitstream from which the input video stream is generated, wherein strength of the processing is dynamically controlled based on the magnitude of the filtered video stream, such that the method reduces both (1) mosquito noise present in the input video signal and (2) aliasing noise resulting from the upscaling, wherein the strength of the processing for low- and high-magnitude filtered video is less than the strength of the processing for intermediate-magnitude filtered video.

15. A system for processing digital video signals, the system adapted to:
  upscale an input video signal having a first dimension to generate an upscaled video signal having a first dimension larger than the first dimension of the input video signal;
  filter the upscaled video signal to generate a filtered video signal, wherein the filtering is based on two passbands interleaved with two stopbands;
  process the filtered video signal to generate an output video signal; and
  dynamically control the process based on compression information associated with a compressed video bitstream from which the input video stream is generated, wherein strength of the processing is dynamically controlled based on the magnitude of the filtered video signal, such that the system reduces both (1) mosquito noise present in the input video signal and (2) aliasing noise resulting from the upscaling, wherein the strength of the processing for low- and high-magnitude filtered video is less than the strength of the processing for intermediate-magnitude filtered video.

* * * * *